(12) United States Patent
Hagedorn

(10) Patent No.: US 8,933,652 B2
(45) Date of Patent: Jan. 13, 2015

(54) ROTOR-BLADE PITCH CONTROLLING DRIVE FOR A WIND TURBINE

(75) Inventor: Ralf Hagedorn, Holdorf (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 142 days.

(21) Appl. No.: 13/266,277

(22) PCT Filed: Feb. 23, 2010

(86) PCT No.: PCT/EP2010/052246
§ 371 (c)(1),
(2), (4) Date: Oct. 26, 2011

(87) PCT Pub. No.: WO2010/124886
PCT Pub. Date: Nov. 4, 2010

(65) Prior Publication Data
US 2012/0056429 A1  Mar. 8, 2012

(30) Foreign Application Priority Data
Apr. 28, 2009 (DE) .......... 10 2009 003 843

(51) Int. Cl.
*H02P 1/00* (2006.01)
(52) U.S. Cl.
CPC ........... *F03D 7/0024* (2013.01); *F05B 2260/76* (2013.01); *F05B 2260/79* (2013.01); *F05B 2260/83* (2013.01); *Y02E 10/723* (2013.01)
USPC ............................... 318/139; 290/44; 290/45
(58) Field of Classification Search
USPC ...................... 318/139; 290/44, 55
See application file for complete search history.

(56) References Cited

U.S. PATENT DOCUMENTS

| 7,355,294 | B2 * | 4/2008 | Teichmann | ............... 290/44 |
| 7,566,981 | B2 * | 7/2009 | Kunkel et al. | ............... 290/44 |
| 8,405,237 | B2 * | 3/2013 | Warfen et al. | ............... 290/44 |
| 2003/0231009 | A1 * | 12/2003 | Nemoto et al. | ............... 323/276 |
| 2007/0024227 | A1 | 2/2007 | Kunkel et al. | |

(Continued)

FOREIGN PATENT DOCUMENTS

| DE | 102 01 136 C1 | 6/2003 |
| DE | 20 2006 018866 U1 | 3/2007 |

(Continued)

OTHER PUBLICATIONS

English Translation of the International Preliminary Report on Patentability (Chapter I of the Patent Cooperation Treaty) for PCT/EP2010/052246, issued Nov. 15, 2011.

(Continued)

*Primary Examiner* — Eduardo Colon Santana
*Assistant Examiner* — Bickey Dhakal
(74) *Attorney, Agent, or Firm* — Harness, Dickey & Pierce, P.L.C.

(57) ABSTRACT

A method of operating a rotor-blade pitch controlling drive of a wind turbine comprising supplying electrical energy to an electrical working load by a primary electrical energy supply, charging an electrical energy storage device by means of a charger, supplying electrical energy to the electrical working load by the electrical energy storage device if the primary electrical supply fails, and temporally disconnecting the electrical energy storage device from the charger in successive intervals, while applying an electric test load to the electrical energy storage device and observing the electrical discharge of the electrical energy storage device.

10 Claims, 3 Drawing Sheets

(56) References Cited

U.S. PATENT DOCUMENTS

2008/0204031 A1* 8/2008 Iwane et al. ............... 324/430
2009/0001726 A1   1/2009 Warfen et al.
2012/0043760 A1* 2/2012 Hagedorn ..................... 290/44

FOREIGN PATENT DOCUMENTS

| DE | 10 2006 009127 A1 | 9/2007 |
|----|-------------------|--------|
| EP | 1739807 A2 | 1/2007 |
| WO | WO-2009/146848 A2 | 12/2009 |
| WO | WO-2010/080391 A2 | 7/2010 |

OTHER PUBLICATIONS

International Search Report (in German with English Translation) and Written Opinion (in German) for PCT/EP2010/052246, mailed Apr. 27, 2011; ISA/EP.

* cited by examiner

ROTOR-BLADE PITCH CONTROLLING DRIVE FOR A WIND TURBINE

CROSS-REFERENCE TO RELATED APPLICATIONS

This application is a 371 U.S. National Stage of International Application No. PCT/EP2010/052246, filed Feb. 23, 2010, and claims priority to German Patent Application No. 10 2009 003 843.4 filed Apr. 28, 2009, the disclosures of which are herein incorporated by reference in their entirety.

The invention relates to a method of operating a rotor blade adjustment drive of a wind turbine, in which an electrical working load is supplied with electrical energy by a primary electrical energy supply and, in the event of the latter failing, is supplied with electrical energy by an electrical energy storage means. The invention also relates to a rotor-blade pitch controlling drive for a wind turbine.

In modern-day wind turbines, output and speed of revolution are regulated by varying the pitch of the rotor-blades, blade pitch controlling systems being used to control the pitch. These systems are usually hydraulic or electrical systems. As a rule, control of the blade pitch is also used for stopping and for stopping in the event of a fault, which means that the blade pitch controlling system constitutes the primary braking system of the wind turbine. To ensure availability for the blade pitch controlling system, use is made of energy storage means which, in the event of a failure of the primary electrical energy supply, supply the drives of the blade pitch controlling system with energy. In the case of electrical blade pitch controlling systems, storage batteries (rechargeable batteries) are regularly used as the energy storage means, monitoring arrangements being used to ensure the safety and availability of the storage batteries. This is typically done by voltage-monitoring relays which, in the event of an under-voltage, send a message to the master control system. It is also possible for the voltage to be measured continuously and statements as to the state of the storage battery to be made as a function of the voltage level. It is also usual for the operation of the batteries to be tested at cyclic intervals by stopping the wind turbine and adjusting the rotor-blades by means of the storage batteries.

None of the above methods allow an accurate statement to be made as to the state of health and/or state of charge of the storage battery during the ongoing operation of the turbine. The disadvantages of the above-mentioned methods lie in particular in the fact that when voltage monitoring relays are used it is only the voltage level in the storage battery which is considered. This however allows only a limited statement to be made about the state of health and state of charge of the storage battery. Even when the storage battery is loaded by the motor of the blade pitch controlling drive, there is only a limited amount which can be learnt from the voltage level because the size of the load is not constant. Furthermore, when use is made of continuous monitoring of the storage battery voltage, the same problems arise as arise with the voltage monitoring relay. It is true that the adjustment of the rotor-blades with the turbine stopped makes it possible for the state of health to be determined in a meaningful way, but the stopping of the turbine has an adverse effect on its availability.

Known from DE 102 01 136 C1 is a method of assessing the state of batteries in battery backed-up power supply systems which have at least two battery circuits in parallel which, depending on their state of charge, alternately supply a load with energy or are recharged by a generator. A charged battery which is being put into operation for the first time in the power supply system is taken and, it having been disconnected from the power supply system by means of a control unit, a discharge characteristic for the residual voltage is automatically plotted for the battery at a discharge resistor in a step-by-step discharge cycle. This step-by-step discharge cycle is repeated at points in time which are to be fixed, to plot a discharge characteristic at the time for the residual voltage. Also, from a reserve length of time laid down beforehand and from the final discharge voltage determined in the first measurement, there is determined from the discharge characteristic at the time for the residual voltage, an alarm residual voltage which is an indication of the residual energy remaining in the battery at the time and the reaching of which, when the battery is operating on the load, causes an alarm to be given to the operator of the power supply system.

This power supply system forms an uninterruptible power supply and the batteries thus serve not to provide an emergency supply but to perform a basic function of the system. The result of this is that a plurality of batteries have to be provided, of which at least one is always coupled to the load.

The known power supply system is relatively expensive. Also, the state of each battery has to be determined separately and it thus takes a relatively long time until the state of all the batteries has been acquired.

Taking the above as a point of departure, the object underlying the invention is to enable the method specified in the opening paragraph to be expanded to include a meaningful acquisition of the state of the energy storage means. The intention is also for the method to be able to be performed quickly.

This object is achieved in accordance with the invention by a method as claimed in claim 1 and by a rotor-blade pitch controlling drive as claimed in claim 13. Preferred refinements of the invention are given in the dependent claims.

The method according to the invention of operating a rotor-blade pitch controlling drive of a wind turbine comprises the step of having an electrical working load supplied with electrical energy by a primary electrical energy supply and, in the event of the latter failing, having it supplied with electrical energy by an electrical energy storage means. The way in which this method is further developed lies in particular in charging the electrical energy storage means electrically by means of an electrical charger and, in successive intervals of time, temporarily disconnecting the energy storage means from the charger and applying an electrical test load thereto, the electrical discharge of the energy storage means caused thereby, i.e. by the application of the test load to the energy storage means which has been disconnected from the charger, being observed.

The method according to the invention can be performed with only a single energy storage means, thus enabling the cost of additional energy storage means to be saved. It is true that a charger is required as an addition but the cost of this is appreciably lower than that of an additional energy storage means suitable for operating at least one electric motor of a blade pitch controlling drive of a wind turbine. Particularly because only one energy storage means is checked, the method according to the invention is also relatively quick.

The observation of the electrical discharge of the energy storage means opens up the possibility of a state of the energy storage means being determined. Therefore, on the basis of the observed discharge of the energy storage means, the state of charge (SOC) and/or the state of health (SOH) of the energy storage means are preferably determined.

The temporary disconnection of the energy storage means from the charger preferably takes place cyclically. In particular, the working load is actively uncoupled electrically from the energy storage means, or is in a state where it is so uncoupled, while it is being supplied with electrical energy by the primary energy supply.

The primary energy supply is preferably an electricity supply system and in particular an a.c. supply system. However, as an alternative the primary energy supply may also be formed by a d.c. supply system. The electricity supply system is for example an internal supply system of the wind turbine or an external supply system, such for example as a wind park supply system or the public electricity supply system.

The charger is in particular provided in addition to the primary energy supply. However, the charger is preferably supplied with electrical energy by the primary energy supply.

During a charging process, the charger feeds an electrical charging current to the energy storage means and/or applies an electrical charging voltage to the energy storage means. The charger preferably controls or regulates the electrical charging current fed to the energy storage means and/or the electrical charging voltage applied to the energy storage means, particularly as a function of the state of charge of the energy storage means.

In one embodiment of the invention, the observation of the discharge of the energy storage means comprises the measurement of the electrical voltage which drops across the test load and/or of the electrical current which is fed to the test load or flows through it. From the voltage which is measured and/or the current which is measured, a discharge curve or at least one discharge curve is determined and/or represented. The discharge curve comprises in particular a plurality of values measured for the voltage and/or measured for the current, as a function of time. In particular the discharge curve is stored in a memory. The state of health of the energy storage means is preferably determined on the basis of the discharge curve.

Because the discharge is carried out and observed repeatedly in successive intervals of time, what are preferably determined are a plurality of states of health, from which in particular a variation over time of the state of health is determined. A state-dependent replacement of the energy storage means is preferably carried out or scheduled on the basis of the variation over time of the state of health.

The test load is preferably a power resistor which is in particular an ohmic resistor. The test load is preferably constant.

The energy storage means preferably has one or more storage batteries or is formed by it or them.

The working load comprises or is formed by, in particular, at least one electric motor which is coupled to at least one rotor-blade and by means of which the rotor-blade can be turned on a blade axis. The coupling between the electric motor and the rotor-blade is preferably mechanical. The electric motor takes the form of, in particular, a d.c. motor or an a.c. motor, e.g. in the form of a polyphase motor.

As an alternative to the method according to the invention, it would be possible to use a charger which loads the battery with a resistor at cyclic intervals. The voltage drop across the load resistor is then measured while the load is applied and by this means a statement is made about the state of the batteries. However, the current state of knowledge suggests that the loading of the storage battery by the charger would permit only very brief and not very energy-intensive discharges which would be very limited as to what they could tell one. The application according to the invention of a test load to the energy storage means thus preferably takes place away from the charger. In particular, the test load is provided externally of the charger.

The invention also relates to a rotor-blade pitch controlling drive for a wind turbine, having an electrical working load which is or can be supplied with electrical energy by a primary energy supply, having an electrical energy storage means which can be electrically coupled to the working load and by means of which the working load is or can be supplied with electrical energy if the primary energy supply fails, and having an electrical switching arrangement by means of which the energy storage means is or can be coupled to the working load if the primary energy supply fails. The way in which the rotor-blade pitch controlling drive is further developed lies in particular in the fact of the energy storage means being, or being able to be, charged electrically by means of an electrical charger and, by means of the switching arrangement and in successive intervals of time, in the fact of the energy storage means being able to be disconnected from the charger temporarily and to have an electrical test load applied to it, the electrical discharge of the energy storage means which is caused thereby being, or being able to be, observed by means of an analysing arrangement.

The method according to the invention is performed in particular with the rotor-blade pitch controlling drive according to the invention. The rotor-blade pitch controlling drive and/or the features thereof can thus be further developed in accordance with all the embodiments which are described in connection with the method according to the invention. The same is true, vice versa, of the method according to the invention.

By means of the switching arrangement, the energy storage means can be disconnected from the charger, and can have an electrical test load applied to it, preferably cyclically, which means that the successive intervals of time are in particular constant or substantially constant. A cyclic discharge of the energy storage means can thus be carried out and observed. The working load preferably is or can be electrically uncoupled from the energy storage means while it is being or can be supplied with electrical energy by the primary power supply. In particular the charger is or can be supplied with electrical energy by the primary energy supply. For this purpose the charger preferably is or can be coupled to the primary energy supply electrically.

The charger is preferably able to feed an electrical charging current to the energy storage means and/or to apply an electrical charging voltage to the energy storage means. The electrical charging current which is fed to the energy storage means and/or the electrical charging voltage which is applied to the energy storage means can preferably be controlled or regulated by means of the charger, particularly as a function of the state of charge of the energy storage means.

The energy storage means preferably has one or more storage batteries or is formed by it or them.

The working load comprises or is formed by in particular at least one electric motor coupled to at least one rotor-blade, by means of which the rotor-blade is or can be turned on a blade axis. The coupling between the electric motor and the rotor-blade is preferably mechanical.

In one embodiment of the invention, the working load is electrically coupled to the primary energy supply via an intervening converter. The converter preferably comprises a rectifier, an output stage and a link circuit which is connected between the rectifier and the output stage and in particular comprises a capacitor. The output stage is for example an inverter, a d.c. chopper or some other device to make available a controllable alternating current or direct current for the electric motor.

The invention opens up a possible way of determining the state, and in particular the state of charge and/or the state of health, of the energy storage means without reducing the availability of the wind turbine by so doing. For this purpose, the energy storage means is preferably disconnected from the charger and loaded with a power resistor in cyclic intervals. During this loading both the voltage and the current are measured and represented as a discharge curve. It is possible for the state of charge and/or the state of health of the energy storage means to be determined from this discharge curve. Because the discharge is carried out under the same conditions each time, the evolution of the state of health can be tracked from the variation over time and a state-dependent replacement of the storage batteries can be scheduled. The checking of the energy storage means can be carried out during the ongoing operation of the wind turbine, thus avoiding drops in its availability. The energy storage means is preferably a storage battery or a rechargeable battery.

The invention will be described below by reference to a preferred embodiment and to the drawings. In the drawings.

Figure 1:
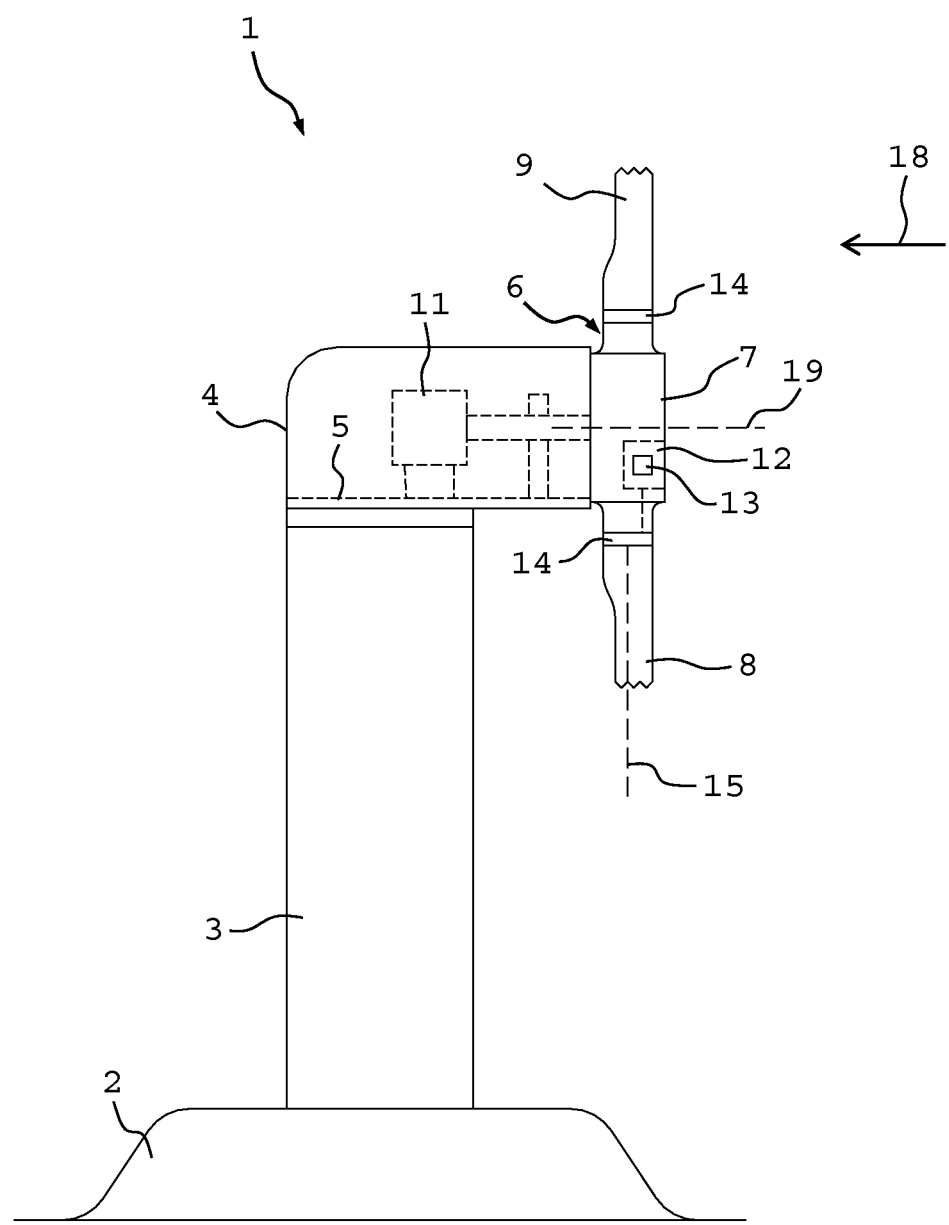
FIG. 1 is a schematic representation of a wind turbine.

There can be seen in FIG. 1 a schematic view of a wind turbine 1 which comprises, standing on a foundation 2, a tower 3 at whose end remote from the foundation 2 is arranged a machinery nacelle 4. The machinery nacelle 4 has a mounting (support) 5 on which a rotor 6, which comprises a rotor hub 7 and a plurality of rotor-blades 8, 9 and 10 connected thereto (see also FIG. 3), is rotatably mounted. The rotor 6 is mechanically coupled to an electric generator 11 which is arranged in the machinery nacelle 4 and which is fastened to the support 5.

Figure 3:
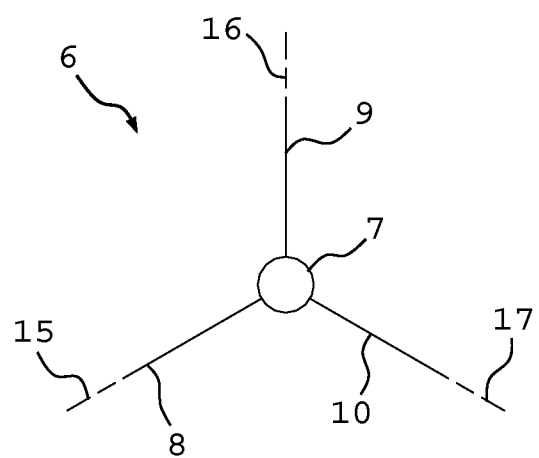
FIG. 3 is a schematic head-on view of the rotor of the wind turbine.

Arranged in the rotor hub 7 is a rotor-blade pitch controlling system 12 which comprises blade pitch controlling drives 14 having emergency power supply arrangements 13, the rotor-blades 8, 9 and 10 being able to be turned relative to the rotor hub 7 on their respective longitudinal axes 15, 16 and 17 by means of the blade pitch controlling drives 14 (see also FIG. 3). The rotor 6 is rotated on a rotor axis 19 by the power of the wind 18.

FIG. 3 is a schematic head-on view of the rotor 6, thus enabling the three rotor-blades 8, 9 and 10 to be seen.

Figure 2:
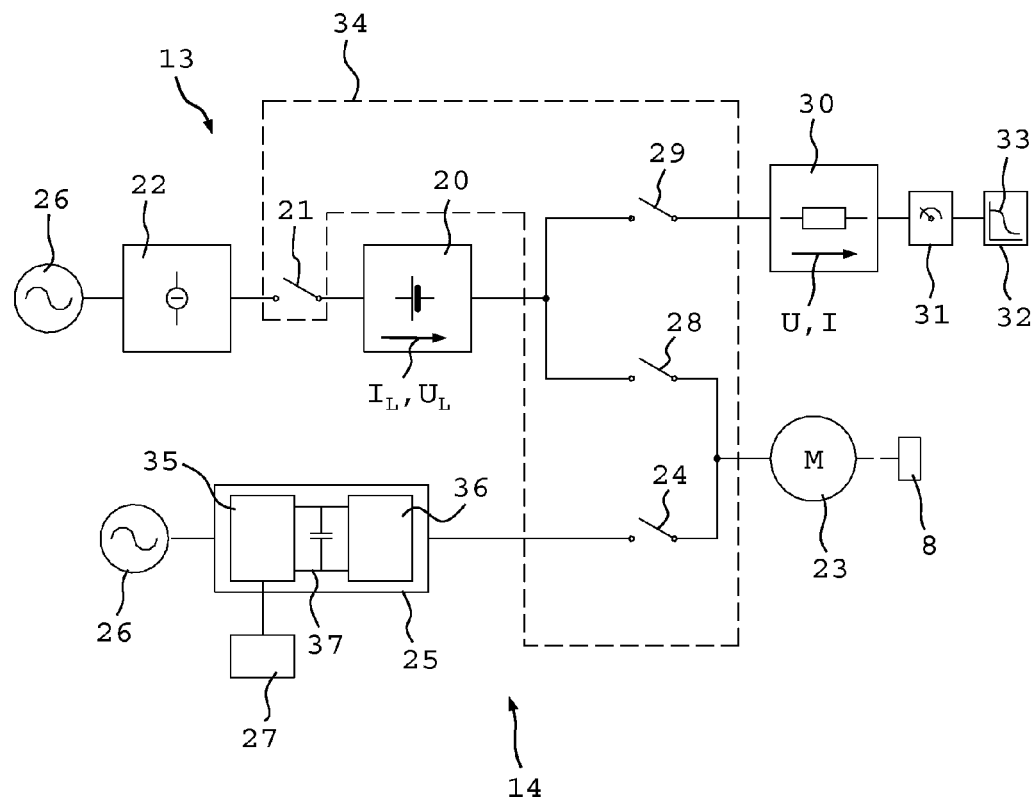
FIG. 2 is a schematic block circuit diagram of an embodiment of blade pitch controlling drive according to the invention.

In FIG. 2 can be seen a schematic representation of one of blade pitch controlling drives 14, together with the associated emergency power supply arrangement 13 which comprises a storage battery 20 which is or can be connected electrically to an electrical charger 22 via an electrical switch 21. The blade pitch controlling drive 14 comprises an electric motor 23 which is mechanically coupled to the rotor-blade 8, thus enabling the latter to be turned on the blade axis 15 by means of the electric motor 23. The electric motor is or can be electrically coupled, via an intervening electrical switch 24, to a converter 25 which is electrically connected to a primary energy supply 26 and is fed by the latter. The converter 25 comprises a rectifier 35, an output stage 36 and a d.c. link circuit 37, having a capacitor, which is connected between the rectifier 35 and the output stage 36. The output stage 36 is for example an inverter or a d.c. chopper. Because the electric motor 23 takes the form of a d.c. motor in this embodiment, reference numeral 36 designates a d.c chopper or some other device for making available a controllable direct current for the electric motor. The converter 25 is coupled to a control system 27 by means of which the converter 25 is actuated to turn the rotor-blade 8 on the blade axis 15.

The electric motor 23 is or can be electrically coupled to the storage battery 20 via an electrical switch 28. Also, the charger 22 is electrically connected to the primary energy supply 26 and is fed by the latter.

Via an electrical switch 29, the storage battery 20 can be loaded by a power resistor 30, which is coupled to a measuring unit 31 by means of which the voltage U applied to the power resistor 30 and the current I flowing through the power resistor 30 can be measured. The measuring unit 31 is coupled to an analysing arrangement 32 by means of which a discharge curve 33, which is only shown schematically, can be determined from the variation over time of the voltage measured and/or the current measured. The analysing arrangement 32 is able to determine the state of health (SOH) of the storage battery 20 on the basis of the discharge curve 33.

The switches 21, 24, 28 and 29 are part of an electrical switching arrangement 34 by means of which these switches can be electrically actuated. The switches 21, 24, 28 and 29 may each take the form of a relay or a transistor in this case. The switching arrangement 34 is controlled by means of the control system 27 or by means of a separate control system.

In normal operation, i.e. when the primary energy supply 26 is present, the switch 24 is closed whereas the switch 28 is open. The electric motor 23 is thus supplied with electrical energy, via the intervening converter 25, solely by the primary energy supply 26. What is more, the switch 21 is in a closed state to charge the storage battery 20, meaning that the storage battery 20 is or can be charged by means of the charger 22, and the switch 29 is preferably open. The charger 22 controls the charging voltage UL applied to the storage battery 20 and/or the charging current IL fed to the storage battery 20 in this case, preferably as a function of the state of charge of the storage battery 20. To check the state of health of the storage battery 20, with the switch 28 open the switch 21 is opened whereas the switch 29 is closed. The storage battery 20 then discharges via the power resistor 30, which is observed by means of the analysing arrangement via the intervening measuring unit 31. Once the state of health has been acquired, the switch 29 is opened again whereas the switch 21 is closed.

The invention claimed is:

1. A rotor-blade pitch controlling drive for a wind turbine comprising:
a control system;
an electrical working load;
an electrical test load;
a primary energy supply supplying electrical energy for the electrical working load;
an intervening converter, the working load being electrically coupled to the primary energy supply via the intervening converter, the converter being coupled to the control system by means of which the converter is actuated to turn a rotor-blade on a blade axis;
an electrical energy storage means which is operable to be electrically coupled to the working load and by means of which the working load is operable to be supplied with electrical energy if the primary energy supply fails, while the electrical test load is uncoupled from the electrical energy storage means;
an electrical switching arrangement responsive to the control system, the electrical switching arrangement configured to directly couple the electrical energy storage means to the working load when the primary energy supply fails, the electrical switching arrangement being controlled by the control system;
a charger operable to charge the electrical energy storage means; and an analyzing arrangement configured to analyze an electrical discharge of the electrical energy storage means at successive intervals;

at each one of the successive intervals, the control system operating to:
control the electrical switching arrangement to electrically disconnect the electrical energy storage means from the working load, and thus electrically isolate the electrical energy storage means from the working load and from the primary energy supply;
control the electrical switching arrangement to electrically disconnect the electrical energy storage means from the charger, to thus electrically isolate the energy storage means from the charger; and
control the electrical switching arrangement to temporarily electrically couple the electrical test load to the electrical energy storage means, while the working load and the charger are both uncoupled from the electrical energy storage means.

2. The rotor-blade pitch controlling drive according to claim 1, wherein the successive intervals are substantially constant time intervals.

3. The rotor-blade pitch controlling drive according to claim 1, wherein the primary energy supply is selectively operable to provide electrical energy to the charger.

4. The rotor-blade pitch controlling drive according to claim 1, wherein the test load is a power resistor.

5. The rotor-blade pitch controlling drive according to claim 1, wherein the control system is configured to control the electrical switching arrangement such that the working load is disconnected from, and electrically isolated from, the electrical energy storage means whenever the electrical test load is electrically coupled to the electrical energy storage means.

6. The rotor-blade pitch controlling drive according to claim 1, wherein the charger and the working load are both always electrically disconnected from, and electrically isolated from, the electrical energy storage means whenever the electrical test load is electrically coupled to the electrical energy storage means.

7. The rotor-blade pitch controlling drive according to claim 3, wherein the charger controls at least one of the electrical charging current which is fed to the electrical energy storage means and the electrical charging voltage which is applied to the electrical energy storage and is based on a function of a state of charge of the electrical energy storage means.

8. The rotor-blade pitch controlling drive according to claim 7, wherein the electrical energy storage means has at least one storage battery.

9. The rotor-blade pitch controlling drive according to claim 8, wherein the electrical working load comprises at least one electric motor coupled to the rotor-blade, wherein the rotor-blade is operable to be turned on the blade axis.

10. A rotor-blade pitch controlling drive for a wind turbine comprising:
a control system;
a blade pitch drive motor;
a primary energy supply supplying electrical energy which is used to drive the blade pitch drive motor;
an electrical energy storage means which is operable to be electrically coupled to the blade pitch drive motor to supply electrical power to the blade pitch drive motor if the primary energy supply fails;
an electrical test load;
an electrical switching arrangement responsive to the controller, the electrical switching arrangement configured such that the electrical energy storage means is directly coupled to the blade pitch drive motor when the primary energy supply fails while the electrical test load is uncoupled from the electrical energy storage means, the electrical switching arrangement being controlled by the control system;
a charger controlled by the control system and operable to charge the electrical energy storage means; and
an analyzing arrangement configured to analyze the electrical discharge of the electrical energy storage means at successive intervals;
the control system further controlling the electrical switching arrangement when the analyzing arrangement is being used, to:
electrically disconnect the electrical energy storage means from the blade pitch drive motor, and thus electrically isolate the electrical energy storage means from the blade pitch drive motor and from the primary energy supply;
to electrically disconnect the electrical energy storage means from the charger, to thus electrically isolate the electrical energy storage means from the charger;
to temporarily electrically couple an electrical test load to the electrical energy storage means while simultaneously electrically isolating the electrical energy storage means from each of the blade pitch drive motor, the charger and the primary power source, which is used to help obtain information useful in analyzing a health of the electrical energy storage means; and
to enable electrical power from the primary power source to be used to electrically power the blade pitch drive motor while the electrical energy storage means is being analyzed by the analyzing arrangement.

\* \* \* \* \*